US011956586B2

(12) United States Patent
Hatfield

(10) Patent No.: US 11,956,586 B2
(45) Date of Patent: Apr. 9, 2024

(54) AUDIO APPARATUS, SENSOR MODULE AND USER DEVICE

(71) Applicant: Cirrus Logic International Semiconductor Limited, Edinburgh Lothian (GB)

(72) Inventor: Robert James Hatfield, Edinburgh (GB)

(73) Assignee: Cirrus Logic Inc., Austin, TX (US)

(*) Notice: Subject to any disclaimer, the term of this patent is extended or adjusted under 35 U.S.C. 154(b) by 134 days.

(21) Appl. No.: 17/636,495

(22) PCT Filed: May 14, 2020

(86) PCT No.: PCT/GB2020/051174
§ 371 (c)(1),
(2) Date: Feb. 18, 2022

(87) PCT Pub. No.: WO2021/038184
PCT Pub. Date: Mar. 4, 2021

(65) Prior Publication Data
US 2022/0321988 A1 Oct. 6, 2022

Related U.S. Application Data

(60) Provisional application No. 62/894,308, filed on Aug. 30, 2019.

(51) Int. Cl.
H04R 1/10 (2006.01)
H04M 1/60 (2006.01)
(Continued)

(52) U.S. Cl.
CPC ........ *H04R 1/1041* (2013.01); *H04M 1/6058* (2013.01); *H04R 5/033* (2013.01); *H04R 25/603* (2019.05)

(58) Field of Classification Search
CPC .. H04R 25/609; H04R 25/603; H04R 1/1041; H04R 2225/61
(Continued)

(56) References Cited

U.S. PATENT DOCUMENTS 7,945,297 B2 5/2011 Philipp
8,290,171 B1 10/2012 Helfrich et al.
(Continued)

FOREIGN PATENT DOCUMENTS

CN 107708011 A 2/2018
EP 2190213 A1 5/2010
(Continued)

OTHER PUBLICATIONS

International Search Report and Written Opinion of the International Searching Authority, International Application No. PCT/GB2020/051174, dated Jul. 20, 2020.

*Primary Examiner* — Disler Paul
(74) *Attorney, Agent, or Firm* — Jackson Walker L.L.P.

(57) ABSTRACT

An audio apparatus is described for communicating with a user device, the audio apparatus comprising: a sensor configured to sense a user input and to generate an input signal representing the user input; and electronic circuitry operable to receive the input signal. The electronic circuitry is configured to: process the input signal, and generate a control signal for controlling at least one switch based on the input signal.

15 Claims, 7 Drawing Sheets

(51) Int. Cl.
*H04R 5/033* (2006.01)
*H04R 25/00* (2006.01)

(58) Field of Classification Search
USPC .............................. 381/74, 77–81, 85, 109
See application file for complete search history.

(56) References Cited

U.S. PATENT DOCUMENTS

| | | | |
|---|---|---|---|
| 9,955,272 B2 * | 4/2018 | Taylor | H04R 29/001 |
| 10,222,973 B2 * | 3/2019 | Schnyder | H04R 25/70 |
| 10,313,777 B2 * | 6/2019 | Nakai | H04R 1/1041 |
| 10,402,020 B1 * | 9/2019 | Starner | H04R 1/1041 |
| 10,514,884 B2 * | 12/2019 | Mathur | H04R 3/00 |
| 10,555,068 B2 * | 2/2020 | Christoph | H04R 1/1041 |
| 10,587,945 B2 * | 3/2020 | Mizuuchi | G10K 11/17823 |
| 10,860,199 B2 * | 12/2020 | Schobel | G06F 3/0485 |

FOREIGN PATENT DOCUMENTS

| | | | |
|---|---|---|---|
| EP | 2869594 A1 | 5/2015 | |
| WO | 2007049254 A1 | 5/2007 | |

* cited by examiner

AUDIO APPARATUS, SENSOR MODULE AND USER DEVICE

The present application is a 371 of International Patent Application No. PCT/GB2020/051174, filed May 14, 2020, which claims priority to U.S. Provisional Patent Application Ser. No. 62/894,308, filed Aug. 30, 2019, each of which is incorporated by reference herein in its entirety.

TECHNICAL FIELD

Examples described herein relate to an audio apparatus for communicating with a user device, a sensor module for communicating with a user device and a user device configured to receive a control signal from an audio apparatus.

BACKGROUND

Mobile devices, such as smartphones and handheld tablets, have historically been controlled by physical buttons (i.e. mechanical buttons) built into the hardware of the mobile devices. Such physical buttons control operations of the mobile devices such as volume control, sleep/wake, lock/unlock and answer call/end call.

The use of physical buttons for controlling the operations of mobile devices has also been applied to headsets which are provided separately from the mobile device and connected by means of a cable, for example. The vast majority of mobile devices are able to detect that a physical button of an associated headset has been pressed by using a 3.5 mm audio jack and cable arrangement to produce device-side biasing in combination with an assumed headset-side arrangement of switches and resistors connected to ground. An example of such a configuration is illustrated in FIG. 1.

FIG. 1 illustrates a headset 10 connected to a user device 14 via a cable 12. The cable 12 connects the headset 10 to a user device 14 using a 3.5 mm audio jack 16 comprising three or four poles. Each pole of the 3.5 mm audio jack 16 provides a different connection between the headset 10 and the user device 14. For example, the first pole connects a left hand side speaker of the headset 10 to the user device 14, the second pole connects a right hand side speaker of the headset 10 to the user device 14, the third pole connects a ground terminal of the headset 10 to the user device 14, and the fourth pole connects a microphone 18 of the headset 10 to the user device 14. The fourth pole is also connected to one side of a bias resistance 26 (Rbias) of the user device 14, the other side of the bias resistance 26 being connected to a microphone bias 28 voltage (MICBIAS).

At the headset 10, in addition to the microphone 18, the fourth pole of the 3.5 mm audio jack 16 is connected to one or more switches, two switches 20, 22 have been illustrated in FIG. 1. The switches 20, 22 are connected in parallel with the microphone 18 between the fourth pole and a ground terminal 24, i.e. the third pole in this example. Each of the switches 20, 22 comprise a different associated resistance value. When one of the switches 20, 22 is pressed its respective resistance forms a potential divider with the bias resistor 26 that is detected by the user device 14, thereby changing the DC voltage generated at the fourth pole such that a different DC voltage is generated at the fourth pole depending on which switch 20, 22 is pressed. The user device 14 performs a "Button Detect" function in order to determine which button has been pressed based on the voltage measured at the fourth pole.

For example, the first switch 20 may be connected in series with a 1 kΩ resistance in the form of R1 and the second switch may be connected in series with a 100 kΩ resistance in the form of R2. In such an arrangement, the DC voltage generated at the fourth pole would be lower when the first switch 20 is pressed compared to when the second switch is pressed 22 (assuming a constant current). The resulting DC voltage of the fourth pole is measured by the user device 14 in order to determine which of the two switches 20, 22 has been pressed. The user device 14 is thereby operable to perform operations or functions according to which of the switches has been pressed. It will be appreciated by those of ordinary skill in the art that in addition to each switch 20, 22 being activated individually the switches 20, 22 could actually be activated in combination so as to represent a third button press function.

This arrangement of resistors and switches in a 3.5 mm jack headset is based on long-established conventions, which means that traditional physical button detection techniques performed by user devices only work correctly if the headset implements a physical button as discussed above in relation to FIG. 1. Therefore, it is desirable for device manufacturers to avoid any changes to this long-established arrangement to maximise cross-compatibility of devices and headsets, including third-party headsets. That is, by maintaining the interface between headset and user device, as discussed above, user devices are able to detect a button press without any modification to the hardware or software of the user device itself.

It is desirable to improve the reliability and functionality of these physical buttons whilst also seeking to maintain the headset to user device interface discussed above in relation to FIG. 1. By seeking to maintain this interface, the cross-compatibility of headsets and user devices is facilitated without requiring modification of user device hardware and/or software.

SUMMARY

According to an example of a first aspect, there is provided an audio apparatus for communicating with a user device, the audio apparatus comprising: a sensor configured to sense a user input and to generate an input signal representing the user input; and electronic circuitry operable to receive the input signal, wherein the electronic circuitry is configured to: process the input signal, and generate a control signal for controlling at least one switch based on the input signal.

The sensor may be a force sensor configured to sense an applied force and sense the input signal represents the applied force.

The at least one switch may be provided in series with a resistance, and the at least one switch may be configured to operably connect the resistance between an output terminal of the audio apparatus and a voltage terminal.

The audio apparatus may further comprise: plural sensors each configured to sense a user input and to generate an input signal representing the respective user input, each sensor being associated with at least one switch from among plural switches. The electronic circuitry may be operable to: receive an input signal from among the plural sensors, process the input signal, and generate the control signal for controlling the at least one switch corresponding to the sensor. The plural sensors may be force sensors each configured to sense an applied force and the input signals may represent the respective applied force. Each of the plural switches may be provided in series with a corresponding resistance, and each switch may be configured to operably connect their respective resistance between the output terminal of the audio apparatus and the voltage terminal.

The input signal may be processed by configuring the electronic circuitry to: identify a characteristic of the input signal, compare the characteristic of the input signal to a characteristic range, and generate the control signal based on the input signal if the characteristic is determined to be within the characteristic range. The characteristic range may comprise a first threshold and a second threshold, and the electronic circuitry may be further configured to determine that the characteristic is within the characteristic range if the characteristic is greater than the first threshold and less than the second threshold.

The input signal may be processed by configuring the electronic circuitry to: identify a characteristic of the input signal, compare the characteristic of the input signal to a plurality of characteristic ranges, wherein each of the plurality of characteristic ranges correspond to a different switch from among plural switches, and if the characteristic is determined to be within one of the plurality of characteristic ranges, generate the control signal for controlling the switch corresponding to the determined characteristic range. The plurality of characteristic ranges may have different respective first and second thresholds, and the electronic circuitry may be further configured to determine that the characteristic is within one of the plurality of characteristic ranges if the characteristic is greater than the first threshold and less than the second threshold of a single characteristic range.

The electronic circuitry may be configured to combine two or more input signals to generate a combined control signal, and the combined control signal controls a single switch.

The characteristic may represent: a magnitude of force; a change in force; a rate of change in force; a length of time a force is applied, a direction of movement of a force and/or a repetition of applied force.

The audio apparatus may further comprise: a mode controller configured to provide an adaptable communication connection for connecting the audio apparatus to the user device, the communication connection being a wired connection means and/or a wireless connection means. The wired connection means may comprise a cable configured to detachably connect to the audio apparatus. The cable may comprise a 3.5 mm audio jack for connecting the audio apparatus to the user device.

According to an example of a second aspect, there is provided a sensor module for communicating with a user device, the sensor module configured to receive an input signal representing a user input applied to a sensor, the sensor module comprising electronic circuitry operable to: process the input signal, and generate a control signal for controlling at least one switching function based on the input signal.

The sensor module may be a force sensor module and the input signal may represent a force applied to a force sensor.

The control signal may be output from an output terminal of the sensor module.

The sensor module may be configured to receive input signals from plural sensors, each input signal representing a user input applied to one said sensor, and each sensor module being associated with at least one switching function from among plural switching functions. The electronic circuitry may be operable to: receive an input signal from among the plural force sensors, process the input signal, and generate the control signal for controlling the at least one switching function associated with the sensor. The plural sensors may be force sensors and each input signal may represent a force applied to the respective force sensor.

The input signal may be processed by configuring the electronic circuitry to: identify a characteristic of the input signal, compare the characteristic of the input signal to a characteristic range, and generate the control signal based on the input signal if the characteristic is determined to be within the characteristic range. The characteristic range may comprise a first and second threshold, and the electronic circuitry may be further configured to determine that the characteristic is within the characteristic range if the characteristic is greater than the first threshold and less than the second threshold.

The input signal may be processed by configuring the electronic circuitry to: identify a characteristic of the input signal, compare the characteristic of the input signal to a plurality of characteristic ranges, wherein each of the plurality of characteristic ranges correspond to a different switching function from among plural switching functions, and if the characteristic is determined to be within one of the plurality of characteristic ranges, generate the control signal for controlling the switching function corresponding to the determined characteristic range. The plurality of characteristic ranges may have different respective first and second thresholds, and the electronic circuitry may be further configured to determine that the characteristic is within one of the plurality of characteristic ranges if the characteristic is greater than the first threshold and less than the second threshold of a single characteristic range.

The electronic circuitry may be configured to combine two or more control signals to generate a combined control signal, wherein the combined control signal controls a single switching function.

The characteristic may represent: a magnitude of force; a change in force; a rate of change in force; a length of time a force is applied, a direction of movement of a force and/or a repetition of applied force.

According to an example of a third aspect, there is provided a user device configured to receive a control signal from an audio apparatus, wherein the control signal is based on an input signal received by the audio apparatus from a sensor in response to the sensor sensing a user input.

The sensor may be a force sensor configured to sense an applied force and the input signal may represent the applied force.

The control signal may control an operation of the user device.

The user device may further comprise: a mode controller configured to provide an adaptable communication connection for connecting the user device to the audio apparatus, the communication connection being a wired connection means and/or a wireless connection means. The wired connection means may comprise a cable configured to detachably connect to the user device. The cable may comprise a 3.5 mm audio jack for connecting the user device to the audio apparatus.

BRIEF DESCRIPTION OF DRAWINGS

Examples of the present aspects are set out with reference to the following drawings, in which.

DETAILED DESCRIPTION OF THE PRESENT EXAMPLES

The description below sets forth examples according to this disclosure. Further examples and implementations will be apparent to those having ordinary skill in the art. Further, those having ordinary skill in the art will recognize that various equivalent techniques may be applied in lieu of, or in conjunction with, the examples discussed below, and all such equivalents should be deemed as being encompassed by the present disclosure.

It will be appreciated that an audio apparatus may be any apparatus configured to generate audio, (e.g. an audio headset or an audio speaker with a microphone). For ease of explanation, an audio headset will be referred to hereinafter when discussing the audio apparatus although it will be appreciated that other types of audio apparatus may be provided.

It will be appreciated that physical or mechanical buttons suffer from a number of disadvantages. For example, physical or mechanical buttons may be prone to failure and/or may be aesthetically unappealing. Furthermore, a physical or mechanical button may represent a source of fluid and/or solid ingress into the headset which may limit the usability of the headset and/or limit the circumstances of use and/or lifespan of the headset. It is therefore desirable to replace one or more physical buttons of a headset with a sensor. For example, the functionality of a home button (e.g. the button responsible for sleep/wake functions of a mobile device) and/or a volume button may be implemented using a sensor, such as a force sensor, which generates signals that are processed by an associated signal processing chain or path, in place of physical buttons. The desired purpose of this signal chain is to output a simulated button press event to the controlling software within the headset and, subsequently, to a user device. The signal processing chain typically consists of amplification, calibration adjustments, filtering and other signal processing steps. This signal processing may take place, for example in an audio CODEC in the headset, where the simulated button may be a software variable.

It will be appreciated that a physical button may be replaced with a variety of different types of sensors configured to receive different types of user inputs. For example, the sensor may be a force sensor and/or a touch sensor configured to sense an applied force. Alternatively, the sensor may be a kinetic sensor configured to sense lateral or rotational movement (i.e. up and down, left and right or a combination thereof). For ease of explanation, a force sensor configured to sense an applied force will be referred to hereinafter when discussing the sensor although it will be appreciated that other types of sensor may be provided. A force sensor may be, for example, a transducer used for measuring force applied by an external force, e.g. from a user's fingertip. Examples of force sensors include inductive, capacitive, piezoelectric and resistive force sensors.

Figure 2:
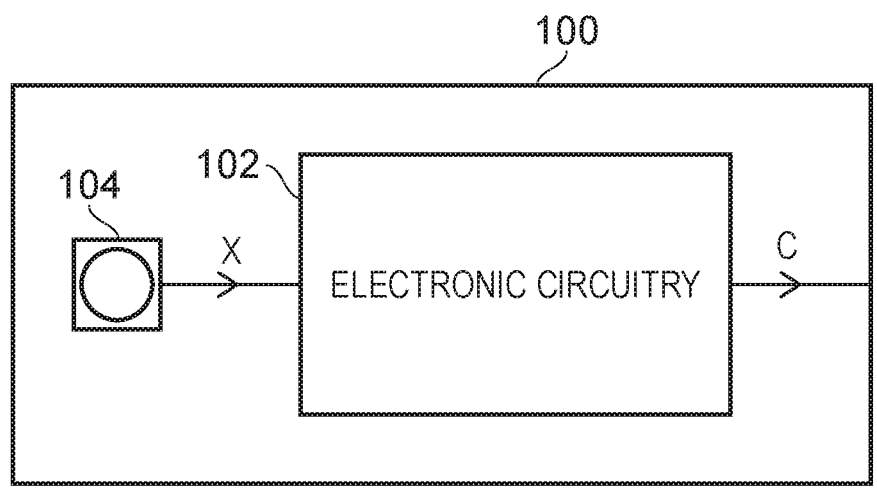
FIG. 2 is a schematic diagram illustrating an audio headset 100 for communicating with a user device according to an example of the present aspects.

FIG. 2 illustrates an audio headset 100 suitable for communicating with a user device according to a first example of the present aspects. The audio headset 100 comprises a sensor—in this example a force sensor 104—configured to sense an applied force, for example from an external source such as a finger-tip. In response to the applied force, the force sensor 104 generates an input signal X that represents the applied force. The audio headset 100 further comprises electronic circuitry 102 operable to receive the input signal X, for example via a signal path (e.g. a wire) established between the force sensor 104 and the electronic circuitry 102. The electronic circuitry 102 may form part of, or may interface with, an operating environment of the user device. Upon receiving the input signal, the electronic circuitry 102 is configured to process the input signal X and to generate a control signal C for controlling at least one switch (not shown) based on the input signal X. According to at least one example, processing of the input signal may be performed using a signal processing path comprising an amplifier, an analog-to-digital converter (ADC) and a signal processor. The at least one switch may be at least one electronic switch such as a MOS transistor, for example, that is switched on and off based on the control signal C.

The input signal X and the control signal C may be, for example, digital signals represented by a high or a low voltage, or may be analog signals represented by a variable voltage.

According to the example of Figure B, by providing a force sensor for simulating a button press event, as described above, one or more mechanical buttons otherwise provided on an audio headsets can be replaced. Therefore, the force sensor and its associated circuitry according to examples of the present aspects may advantageously reduce the failure rate of audio headsets. Providing one or more force sensors in an audio headset in place of at least one mechanical button also offers improvements regarding the ingress of fluids and/or solids. According to at least one example, the housing of an audio headset can be manufactured to be waterproof by means of a watertight seal around a force sensor. It will be appreciated that a mechanical button on the other hand requires a space or gap between the mechanical button and the housing in order to allow the button to move relative to the audio headset housing. This gap increases the likelihood of water ingress for example and, thus, damage if the audio headset is exposed to water or possibly any other fluid and/or solid ingress. The reliability of audio headsets is therefore potentially also improved compared to prior art systems.

Figure 1:
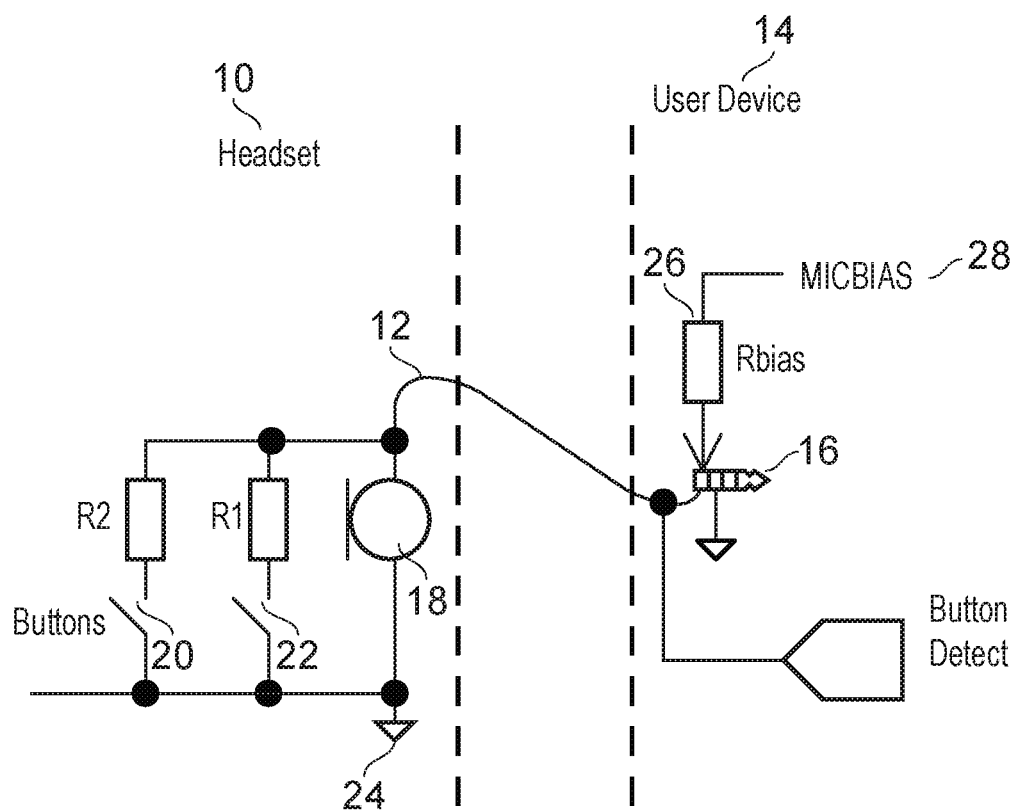
FIG. 1 illustrates a headset 10 according to prior art systems.
Figure 3:
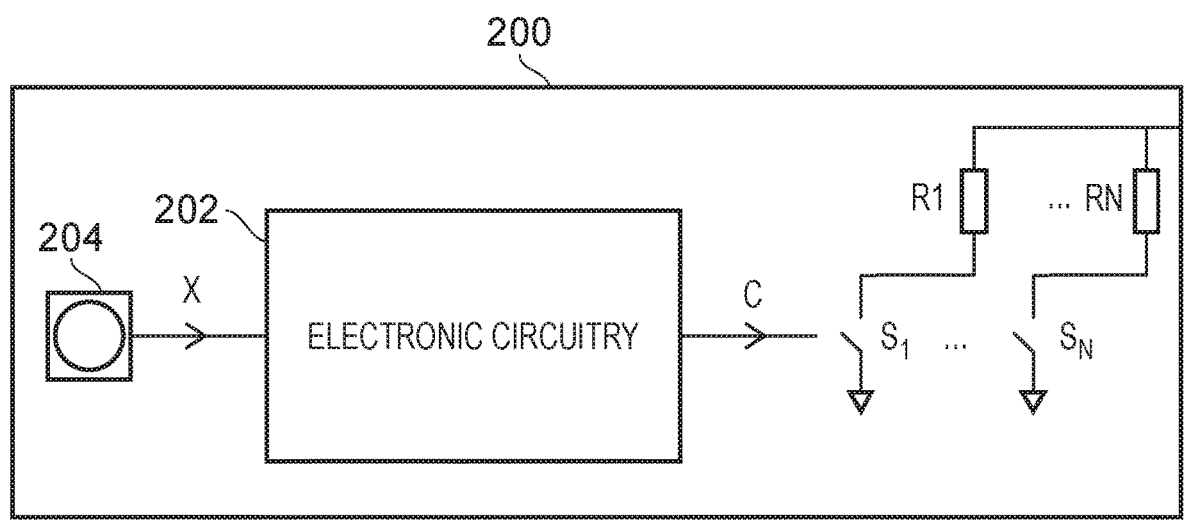
FIG. 3 is a schematic diagram illustrating another audio headset 200 for communicating with a user device according to an example of the present aspects.

FIG. 3 shows an audio headset 200 according to a second example. The audio headset 200 is similar to the headset of FIG. 2 in that it comprises electronic circuitry 202 and a force sensor 204. The audio headset 200 of FIG. 3 additionally comprises the cable and the arrangement of resistors $R_1$ to $R_N$ and switches Si to SN, where N is an integer of 2 or more, as described in FIG. 1 for connecting the audio headset 200 to a user device.

According to at least one example, an audio headset may comprise at least one speaker for outputting audio and at least one microphone for inputting audio. That is, the audio apparatus may be a mono headset comprising a single speaker and a microphone. Alternatively, the audio apparatus may be a stereo headset comprising a left hand side speaker, a right hand side speaker and a microphone. The microphone may be integrated into the audio headset or the microphone may be located at the end of a boom extending outwardly from the audio headset.

In some examples, a switch is provided in series with a resistance, and the switch is configured to operably connect the resistance between an output terminal or node of the audio headset and a voltage terminal (i.e. reference voltage or voltage supply). For example, when the switch is closed the resistance is connected directly to the output terminal and the voltage terminal to form a complete circuit, and when the switch is opened the resistance is disconnected from the voltage terminal. The resistance may be, for example, a resistor having a specific resistance value (e.g. 1 k$\Omega$, 100 k$\Omega$ etc.). The voltage terminal may be, for example, a reference voltage, a ground terminal or a voltage supply.

According to one or more of the present examples, it is beneficially possible to emulate (i.e. simulate) at least one physical button by controlling the state of a switch based on processing performed on a sensed input signal (i.e. generating a virtual button variable) in order to fulfil the same functionality as the physical button.

Advantageously, the audio headset according to examples of the present aspects remain compatible with the standardised techniques used by the majority of user devices to detect button press events using a three or four pole 3.5 mm audio jack arrangement. Therefore, the advantages of providing a simulated button press event in place of a mechanical button are enjoyed without requiring third-party user devices to adapt any hardware and/or software for compatibility reasons.

Other examples of the present aspects are described with reference to FIG. 4.

Figure 4:
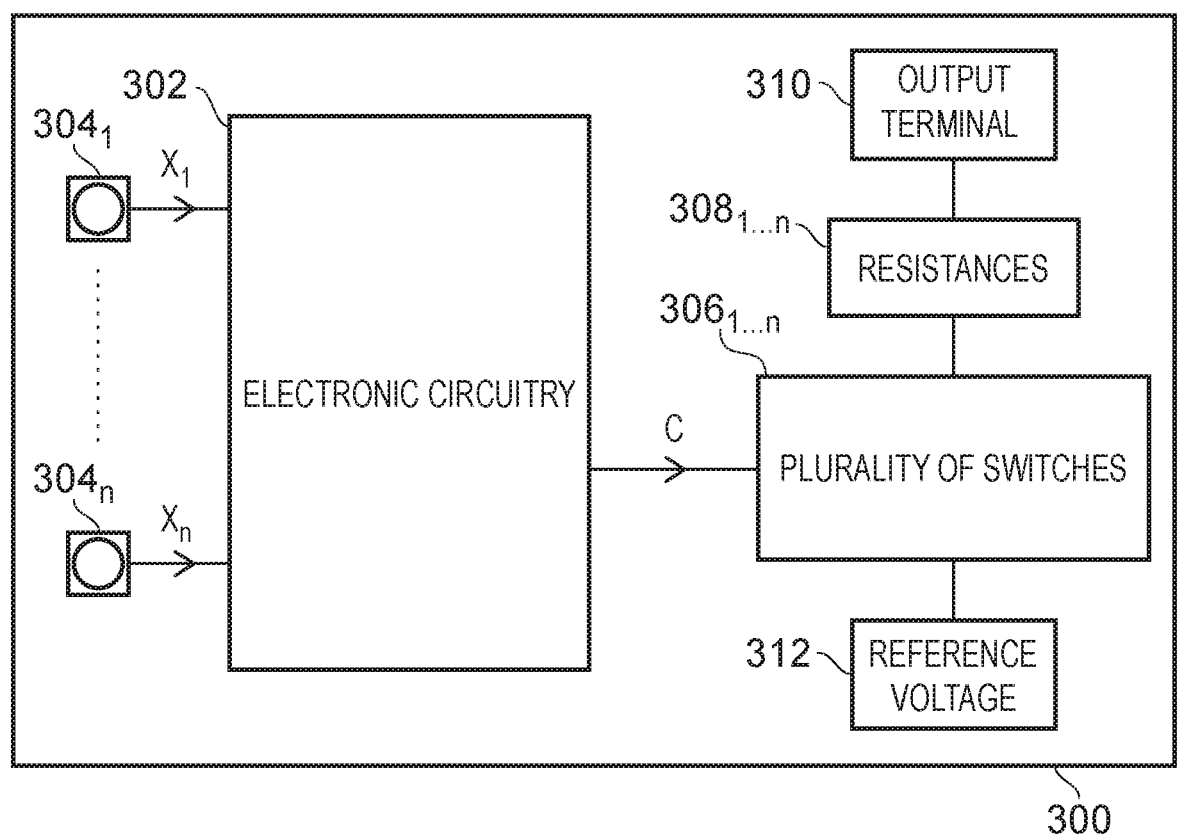
FIG. 4 is a schematic diagram illustrating another audio headset 300 for communicating with a user device according to an example of the present aspects.

FIG. 4 illustrates an audio headset 300 according to a third example of the present aspects. The headset 300 comprises plural force sensors $304_{1 \ldots n}$ each configured to sense an applied force and to generate an input signal $X_{1 \ldots n}$ that represents the applied force, for example from an external force such as a fingertip. The headset 300 further comprises electronic circuitry 302 for processing the input signals and a plurality of switches or bank of switches (i.e. a switch network) 306. According to the present example, each force sensor $304_{1 \ldots n}$ is associated with, or corresponds to, at least one switch from among plural switches $306_{1 \ldots n}$. For example, first and second sensors $304_{1,2}$ may be associated with two different switches $306_{1,2}$. Alternatively, the first and second sensors $304_{1,2}$ may correspond to the same switch $306_3$. As a further example, plural sensors may correspond to a mixture of the same and different switches. According to one particular example, in a case where the audio headset 300 comprises three force sensors $304_{1,2,3}$, three different switches $306_{1,2,3}$ may be controlled based on the three input signals generated by three distinct force sensors $304_{1,2,3}$.

The electronic circuitry 302 of the audio headset 300 may be operable to receive a given input signal from among the plural force sensors $304_{1 \ldots n}$, for example via a signal path (e.g. a wire) established between the respective force sensors and the electronic circuitry 302. Upon receiving the given input signal, the electronic circuitry 302 is configured to process the given input signal X and generate a control signal C for controlling at least one switch $306_x$ in the switch network 306 which is associated with, the force sensor. For example, in a case where the audio headset 300 comprises two force sensors $304_{1,2}$ and two different switches $306_{1,2}$, a first force sensor $304_1$ may generate a first input signal $X_1$ which is processed in order to operate a first switch $306_1$ and a second force sensor $304_2$ may generate a second input signal $X_2$ which is processed in order to operate a second switch $306_2$. In this example, the electronic circuitry 302 may be configured to successively or simultaneously process plural input signals $X_{1 \ldots n}$ received from plural force sensors $304_{1 \ldots n}$ in the order in which the input signals $X_{1 \ldots n}$ are received.

Processing of the given input signal may be performed using a signal processing chain comprising an amplifier, an analog-to-digital converter (ADC) and a signal processor. The plural switches $306_{1 \ldots n}$ may be electronic switches that are switched on and off based on the control signal.

In some examples, each of the plural switches $306_{1 \ldots n}$ in the switch network 306 is provided in series with a corresponding resistance 308 from among plural resistances $308_{1 \ldots n}$, in a resistance network 308, and each switch $306_{1 \ldots n}$ is configured to operably connect their respective resistance 308 between an output terminal 310 of the audio headset and a voltage terminal 312. For example, when a given switch $306_x$ is closed, the respective resistance $308_x$ of that switch $306_x$ is connected directly between the output terminal or node 310 and the reference voltage (i.e. voltage terminal) 312 to form a closed circuit, and when a given switch $306_x$ is opened the respective resistance $308_x$ of that switch $306_x$ is disconnected from the voltage terminal 312. The respective resistances may be, for example, resistors having a specific resistance value (e.g. 1 k$\Omega$, 100 k$\Omega$ etc.). The voltage terminal may be, for example, a reference voltage such as a ground terminal or a voltage supply.

It will be appreciated that an electronic circuitry 302 or signal processor receives an input signal $X_{1 \ldots n}$ which represents a user input. The input signal $X_{1 \ldots n}$ may represent a user input comprising one or more of: touch and/or gestural user inputs representing a force that can be detected by a touch-sensitive surface of the headset; kinetic user inputs such as rotating or tilting the headset that can be detected by a sensor such as an accelerometer or gyroscope of the headset. In response to detection of an input signal the electronic circuitry 302 or signal processor is operative to generate appropriate outputs or control signals.

In some examples, the input signal $X_x$ of a given force sensor $304_x$ is processed by configuring the electronic circuitry 302 to identify a characteristic of the input signal $X_x$, compare the characteristic of the input signal $X_x$ to a predetermined characteristic range, and generate the control signal C based on the input signal $X_x$ if the characteristic is determined to be within the characteristic range. That is, the control signal C is output by the electronic circuitry 302 if the characteristic of the input signal $X_x$ falls within a characteristic range and the switch 306 corresponding to that characteristic range is operated.

In some examples, the characteristic may be identified by performing signal processing to extract characteristic information, e.g. determining a magnitude of the input signal voltage, determining a change of magnitude of the input signal voltage, determining a rate of change of magnitude of the input signal voltage, determining a length of time of a voltage signal, determining a repetition of input signal voltage spikes, determining a direction of movement of a voltage signal across plural sensors or determining a Fast Fourier Transfer (FFT) to identify certain frequencies within the signal.

In a case where plural force sensors $304_{1 \ldots n}$ are used each may output a different input signal and the signal processing discussed above may be performed separately on each of the different input signals. That is, for each input signal $X_{1 \ldots n}$, the characteristic may be compared to a unique characteristic range and the control signal C may be generated for every input signal having a characteristic that is within its respective characteristic range. For example, if the characteristic of a first input signal $X_1$ falls within a first characteristic range, the control signal C is generated and configured to control a first switch $306_1$ corresponding to the first characteristic range. After the first input single has been processed, if the electronic circuitry 102 determines that the characteristic of an Nth input signal falls within an Nth characteristic range, the control signal C is generated again and configured to control an Nth switch $306_N$ corresponding to the Nth characteristic range (where N is a positive integer greater than one). In this way, a single control signal C is used to control all of the switches. Alternatively, for example, the electronic circuitry 102 may be configured to generate plural control signals $C_{1...n}$ corresponding to each characteristic range such that plural input signals $X_{1...n}$ may be processed simultaneously, and plural switches $306_{1...n}$ may be operated simultaneously by the plural control signals $C_{1...n}$.

Therefore, in the case where the audio headset 300 comprises a single force sensor $304_x$, the single force sensor $304_x$ may be configured to control a single switch $306_x$ according to a sensor-switch ratio of 1:1. In the case where the audio headset 300 comprises plural force sensors $304_{1...n}$, each force sensor $304_{1...n}$ may be configured to control at least one switch according to a sensor-switch ratio of M:M (where M is an integer greater than one and the audio headset 300 comprises M force sensors 304 and M switches 306).

In some examples, the characteristic range comprises a first threshold and a second threshold, and the electronic circuitry is further configured to determine that the characteristic is within the characteristic range if the characteristic is greater than the first threshold and less than the second threshold. The characteristic range may be a range of criteria with which the characteristic must comply in order for the control signal to be generated. For example, the criteria may be a range of magnitudes, a range of changes in magnitude, a range of rates of change in magnitude, a range of repeated magnitude spikes, a range of time periods during which the magnitude is maintained, or a range of frequencies. The first threshold may be the upper threshold and the second threshold may be the lower threshold, or vice-versa. For example, the first threshold may be 5V and the second threshold may be 1V and the determined characteristic may be determined to fall within the characteristic range if the measured voltage of the characteristic is greater than or equal to 1V and less than or equal to 5V.

In some examples, the characteristic may be compared to a fixed point or value instead of or as well as a characteristic range. That is, the characteristic may be compared to a fixed point or value represented by a characteristic value. The processing of a characteristic when comparing it to a characteristic value is the same as the processing discussed above in relation to comparing a characteristic to a characteristic range. For example, in a case where the determined characteristic is 2V and the characteristic value is 3V, the characteristic may be compared to the characteristic value, instead of or as well as a characteristic range, to determine if the characteristic corresponds to the characteristic value. In this example, the electronic circuitry may determine that the characteristic is not 3V and therefore does not correspond to the characteristic value.

In some examples, a single input signal $X_x$ is processed by configuring the electronic circuitry 302 to compare the characteristic of the input signal $X_x$ to a plurality of characteristic ranges, wherein each of the plurality of characteristic ranges corresponds to a different switch $306_x$ from among plural switches $306_{1...n}$. If the characteristic is determined to be within one of the plurality of characteristic ranges, the electronic circuitry 302 generates the control signal C for controlling the switch $306_x$ corresponding to the determined characteristic range. That is, the control signal C is output by the electronic circuitry 302 if the characteristic of the input signal falls within one of the characteristic ranges such that the switch $306_x$ that corresponds to that particular characteristic range is operated.

In a case where plural force sensors $304_{1...n}$ each output a different input signal $X_{1...n}$, the above discussed processing may be performed separately on each of the different input signals $X_{1...n}$. That is, for each input signal $X_{1...n}$, the characteristic may be compared to the plurality of characteristic ranges and the control signal C may be generated for every input signal having a characteristic that is within one of the characteristic ranges. For example, if the characteristic of a first input signal $X_1$ falls within a first characteristic range $P_1$ from among plural characteristic ranges $P_{1...n}$ (where P is an integer greater than one), the control signal C is generated and configured to control a first switch $306_1$ corresponding to the first characteristic range $P_1$. After the first input single $X_1$ has been processed, if the electronic circuitry 302 determines that the characteristic of an Nth input signal $X_n$ falls within an Nth characteristic range $P_n$ from among the $P_{1...n}$ characteristic ranges, the control signal C is generated again and configured to control an Nth switch $306_n$ corresponding to the Nth characteristic range $P_n$ (where N is a positive integer greater than one). In this way, a single control signal C is used to control all of the switches. Alternatively, for example, the electronic circuitry 302 may be configured to generate plural control signals $C_{1...n}$ corresponding to each characteristic range $P_{1...n}$ such that plural input signals $X_{1...n}$ may be processed simultaneously, and plural switches $306_{1...n}$ may be operated simultaneously by the plural control signals $C_{1...n}$.

Therefore, in the case where the audio headset 300 comprises a single force sensor $304_x$, the single force sensor $304_x$ may be configured to control plural switches $306_{1...n}$ by comparing the characteristic of the input signal $X_x$ to the plurality of characteristic ranges $P_{1...n}$ and operating the switch $306_x$ that corresponds to the characteristic range $P_x$ within which the characteristic falls. The number of switches that may be operated by a single force sensor $304_x$ can therefore be defined by a ratio of 1:Q (where Q is an integer greater than one which represents the number of switches that can be controlled by a single force sensor $304_x$). In the case where the audio headset 300 comprises plural force sensors $304_{1...n}$, each force sensor 304 may be configured to control plural switches $306_{1...n}$ by comparing the characteristic of each input signal $X_{1...n}$ to the plurality of characteristic ranges $P_{1...n}$ and operating the switches 306 that correspond to the characteristic ranges within which the characteristics fall. An M number of force sensors 104 may be configured to each operate plural switches according to a ratio of 1:Q.

In some examples, the plurality of characteristic ranges $P_{1...n}$ have different respective first and second thresholds. That is, each characteristic range has a first and second threshold that is different from the other characteristic ranges. The electronic circuitry may be further configured to determine that the characteristic is within one of the plurality of characteristic ranges if the characteristic is greater than the first threshold and less than the second threshold of a single characteristic range. Therefore, different switches may be operated based on the characteristic range in which the characteristic of the input signal is determined to fall.

Each characteristic range may therefore be associated with a different simulated button press.

The plurality of characteristic ranges may be ordered consecutively in descending or ascending order of characteristic magnitude, e.g. a first characteristic range may have a range of 0V to 2V, and a second characteristic range may have a range of 2V to 4V. The plurality of characteristic ranges $P_{1 \ldots n}$ may be configured such that there is no overlap between the ranges by introducing a tolerance band between each range. For example, a second threshold of a first characteristic range may be an upper threshold of 1V and a first threshold of an adjacent second characteristic range may be a lower threshold of 1.2V in order to maintain a 0.2V tolerance band between the two ranges.

The first threshold may be the upper threshold and the second threshold may be the lower threshold, or vice-versa. For example, the first threshold may be 5V and the second threshold may be 1V.

Advantageously, due to the reduced size of force sensors compared to a mechanical button, plural force sensors can be incorporated into a space on audio headset housing which may only be sufficient to incorporate a single mechanical button. Therefore, more simulated buttons can be incorporated into an audio headset than mechanical buttons due to the use of force sensors to simulate button presses.

Furthermore, the non-binary nature of the force sensor allows for a single force sensor to perform multiple actions, as discussed above. For example, due to the processing performed by the electronic circuitry, different characteristics can be extracted from a single force sensor input signal, depending on the type of force that is applied, such that multiple switches can be operated by a single force sensor. This provides the advantage that fewer force sensors are required to simulate multiple buttons presses compared to the number of mechanical buttons that would be required to perform the same number of multiple button presses. Due to the adaptable nature of software that is used to process the input signal(s) from the force sensor(s) and control the downstream electronic circuitry, different types of simulated button presses can be incorporated (i.e. additional functionality) into the audio headset after manufacture without requiring replacement components.

In some examples, the electronic circuitry 302 may be configured to combine two or more input signals to generate a combined control signal. The combined control signal may be subsequently used to control a single switch $306_x$ from among the plural switches $306_{1 \ldots n}$. For example, two input signals may be combined by appropriate signal processing and a characteristic of the combined input signals may be identified. This characteristic may then be processed as discussed above in order to control the switch corresponding to the determined characteristic range. Alternatively, in a case where two different characteristics are identified from two different input signals, both characteristics may be compared to the plurality of characteristic ranges $P_{1 \ldots n}$ and the control signal C may be generated based on the results of these comparisons. According to certain examples, the combined control signal may be generated in order to sense lateral motion, e.g. the shaking of a head.

In some non-exhaustive examples, the characteristic represents a magnitude of force, a change in force, a rate of change in force, the length of time a force is applied, a direction of movement of an applied force and/or a repetition of applied force. In some examples, a plurality of sensors may be arranged in a switch array to detect a direction of movement of a force (e.g. a direction of movement across a user interface surface, such as swiping). For example, plural sensors may be used to detect upward swiping, downward swiping, swiping to the left and swiping to the right, based on the sensed force. The directional sensing may be performed by measuring the relative timing of force being applied to plural sensors. Sensing a direction of applied force may be processed as a distinct event used to indicate the increase or decrease in a headset audio volume, for example.

In some non-exhaustive examples, the audio headset 300 may further comprise a mode controller configured to provide an adaptable communication connection for connecting the audio headset 300 to the user device. The communication connection may be a wired connection means and/or a wireless connection means. Therefore, the audio headset 300 may be configured to connect to the user device via the wired connection means, via the wireless connection means, or via the wired connection means and the wireless connection at the same time. The audio headset 300 may also be configured to connect to a first user device using the wired connection means and connect to a second user device using the wireless connection means, and vice-versa.

In some examples, the wired connection means comprises a cable configured to detachably connect to the headset. The cable may be, for example, the cable 12 discussed in relation to FIG. 1.

In some examples, the cable may comprise a three or four pole 3.5 mm audio jack for connecting the audio headset 300 to the user device.

Advantageously, the audio headset according to examples of the present aspects remain compatible with the standardised techniques used by the majority of user devices to detect button press events using a three or four pole 3.5 mm audio jack. Therefore, the advantages of providing a simulated button press event in place of a mechanical button are enjoyed without requiring third-party user devices to adapt any hardware or software for compatibility reasons.

In some examples, the wireless connection means comprises a Radio Frequency (RF) transmitter and/or receiver and the communication is performed according to, for example, one or more of the following communication protocols: Bluetooth, Z-wave, ZigBee, Infrared Data Association (IrDA), Serial to Peripheral Interface (SPI) and Inter-Integrated Circuit ($I^2C$). In particular, the SPI and/or the $I^2C$ protocols may be used by the mode controller as a communication interface to communicate to the user device whether the wireless communication means is being used, whether the wired communication means is being used, or whether both the wireless and the wired communication means are being used by the audio headset 300.

Advantageously, the one or more force sensors may be incorporated into the housing of the audio headset instead of the cable such that the wireless connection means can be used to provide one or more simulated button presses without the need for the cable. Furthermore, removing mechanical buttons from a cable itself reduces the manufacturing cost of a cable.

In some examples, the one or more force sensors may be configured to provide haptic feedback to a user in response to the user applying a force to the force sensor. Haptic feedback has the advantage of indicating to the user when a simulated button press has been detected by the audio headset.

Figure 5:
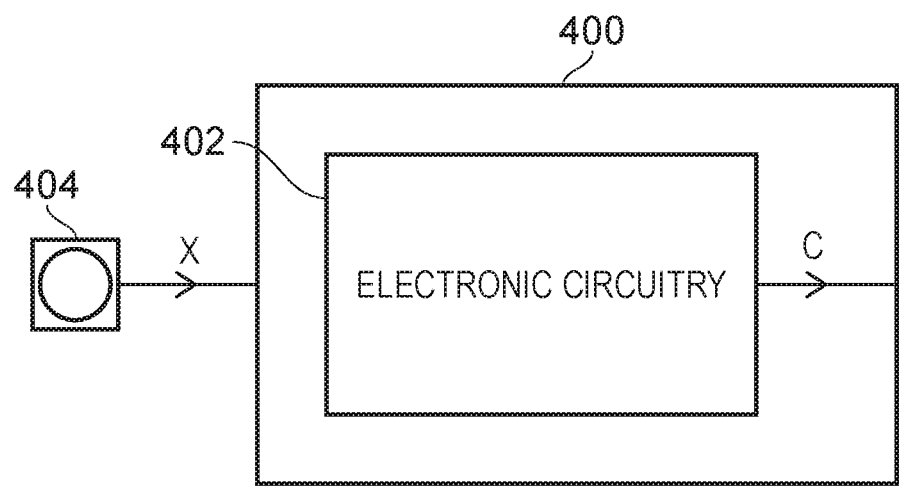
FIG. 5 is a schematic diagram illustrating a sensor module 400 for communicating with a user device according to an example of the present aspects.

Certain features from the above discussed examples may alternatively be implemented by a sensor module 400 illustrated by FIG. 5.

It will be appreciated that physical buttons may be replaced with a variety of different sensor modules configured to receive different types of user inputs. For example, the sensor module may be a force sensor module and/or a touch sensor module configured to sense an applied force, or a kinetic sensor module configured to sense lateral or rotational movement (i.e. up and down, left and right or a combination thereof). For ease of explanation, a force sensor module will be referred to hereinafter when discussing the sensor module.

FIG. 5 illustrates a force sensor module 400 for communicating with a user device according to a further example. The force sensor module 400 of FIG. 5 is configured to receive an input signal X representing a force applied to a force sensor 404, for example from an external source such as a fingertip. The force sensor module 400 further comprises electronic circuitry 402 operable to process the input signal X and generate a control signal for controlling at least one switching function based on the input signal X. Processing of the input signal may be performed using a signal processing chain comprising an amplifier, an analog-to-digital converter (ADC) and a signal processor. The switching function may be the switching of one or more electronic switches that are switched on and off based on the control signal.

In some examples, the control signal is output from an output terminal of the force sensor module 400.

In some examples, the force sensor module 400 may comprise one or more force sensors.

In some examples, the force sensor module 400 may comprise one or more switches configured to perform one or more switching functions.

In some examples, the force sensor module 400 may comprise one or more resistors connected in series with the one or more switches, according to the arrangement discussed above in relation to FIG. 1, in order to generate different voltage levels at a module output terminal of the force sensor module 400.

Incorporating the one or more switches and/or the one or more resistors into the force sensors module 400 reduces the number of pin connections required to connect the force sensor module 400 to a PCB, and thereby provides the following advantages: reducing the amount of PCB routing necessary, reducing the amount of bonding required, reducing the likelihood of failure, providing a smaller footprint on the PCT and reducing overall manufacturing costs.

Figure 6:
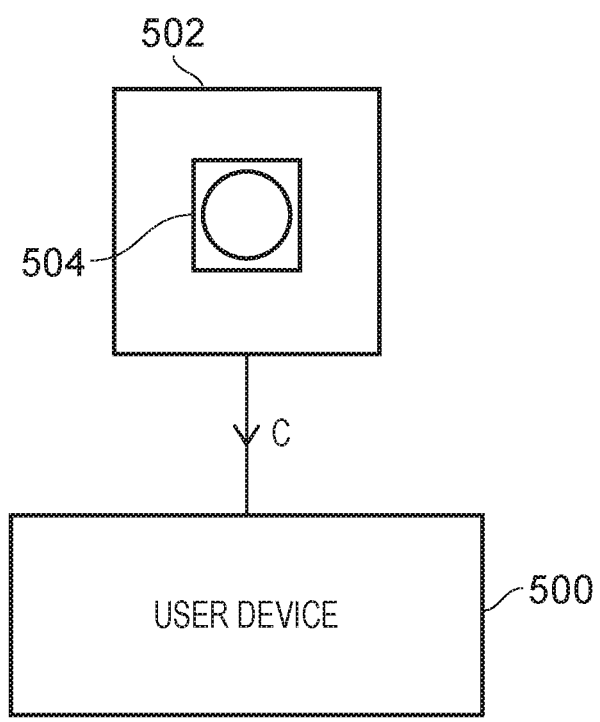
FIG. 6 is a schematic diagram illustrating a user device 500 configured to receive a control signal from an audio headset according to an example of the present aspects.

FIG. 6 illustrates, a user device 500 configured to receive the control signal C from an audio headset 502. The received control signal C is based on an input signal received by the audio headset 100 from a force sensor 504 in response to the force sensor 504 sensing an applied force. The user device 500 may be any consumer electronics device that can be connected to the audio headset 502, e.g. a mobile phone or mobile tablet.

In some examples, the control signal C may be configured to control an operation of the user device 500. For example, upon reception of the control signal C from the audio headset 502, the user device 500 may process the control signal C in order to determine which operation should be performed. Such operations may include, for example, volume control, sleep/wake of the user device screen, lock/unlock of the user device 500, and answering/declining a call received by the user device 500.

In some examples, the user device 500 may further comprise a mode controller configured to provide an adaptable communication connection for connecting the user device 500 to the audio headset 502. The communication connection may be a wired connection means and/or a wireless connection means. Therefore, the user device 500 may be configured to connect to the audio headset 502 via the wired connection means, via the wireless connection means, or via the wired connection means and the wireless connection means at the same time.

In some examples, the wired connection means comprises a cable configured to detachably connect to the user device 500. The cable may be, for example, the cable 12 discussed in relation to FIG. 1.

In some examples, the cable may comprise a three or four pole 3.5 mm audio jack for connecting the user device 500 to the audio headset 502.

A specific example of the present aspects will now be described in relation to FIG. 7.

Figure 7:
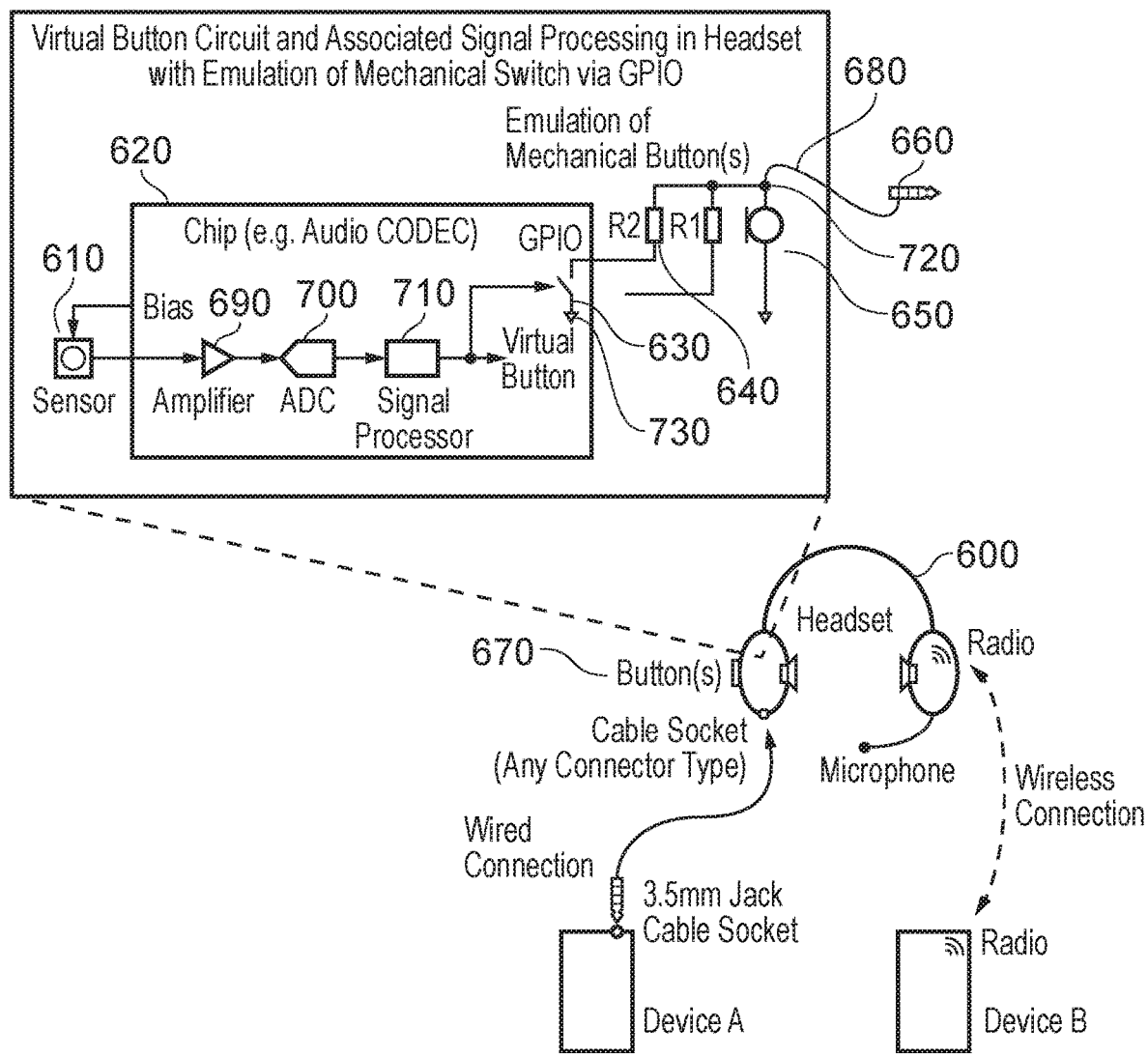
FIG. 7 illustrates an audio headset 600 according to another example of the present aspects.

FIG. 7 illustrates an audio headset 600 according to a further example. The audio headset 600 comprises a virtual button circuit and associated signal processing for emulating mechanical (physical) switches via General Purpose Input/Output (GPIO) pins. A single virtual button circuit comprises a force sensor 610, an audio chip 620 (e.g. an audio CODEC), a GPIO pin 630, a resistor 640, a microphone 650 and a ground node 730.

In use, the force sensor 610 is arranged to receive a bias (e.g. a bias voltage) in order to sense an applied force. This applied force may be received from a user pressing a button 670 positioned on the external housing of the audio headset 600. In certain examples, the button 670 may be the force sensor 610 itself or alternatively the button 670 may be a contact between the housing of the audio headset 600 and the force sensor 610. After the applied force has been sensed, the force sensor 610 generates an input signal which represents the applied force. For example, the input signal may represent the magnitude of the force applied to the force sensor 610. This input signal is sent to the audio chip 620 in which virtual button processing is performed.

The audio chip 620 may comprise an amplifier 690, an analog-to-digital converter (ADC) 700, a signal processor 710 and an output terminal or node 720. The input signal may be amplified by the amplifier 690 in order for the analog-to-digital converter 700 to convert the analog input signal into a digital signal. This converted digital signal may be processed by the signal processor 710 in order to, for example, perform calibration adjustments, perform filtering of the digital signal and perform other signal processing steps. The resulting processed signal may be stored in a memory of the single processor 710 as a software variable. This software variable may be used to determine when and how to generate a control signal for operating the GPIO pin 630. For example, the value of the software variable may be compared to a characteristic range (as discussed above in relation to other examples) in order to determine whether or not the GPIO pin should be operated. If the value of the software variable is determined to fall within a characteristic range by the signal processor 710, the control signal may be generated and sent to the GPIO pin 630 in order to connect the resistor 640 to the ground node 730.

The resistor 640 may be configurable between pull-up mode (i.e. connecting to a voltage supply to generate logic 1), pull-down mode (i.e. connecting to a ground terminal to generate a logic 0) and high-impedance mode (i.e. a mode in which the resistor is not connected to a voltage terminal or a reference voltage such as a ground terminal thereby forming an open circuit and a high impedance). In the present example, the resistor operates in pull-down mode when the GPIO pin 630 is closed.

In some examples, the resistor 640 and/or the GPIO pin 630 are incorporated within the audio chip 620. Advantageously, incorporating the resistor 640 and/or the GPIO pin 630 within the audio chip 620 reduces the number of pin connections required to connect the virtual button circuitry to a PCB thereby reducing the amount of routing necessary, reducing the amount of bonding required, and reducing overall manufacturing costs.

The GPIO pin 630 may be closed for a sufficient period of time (e.g. 1 ms, 100 ms, 1 s etc.) to cause a voltage signal drop at the output terminal 720 that can be detected by a user device via a cable 680 and a three or four pole 3.5 mm audio jack 660, or via wireless communication such a Bluetooth. After the GPIO pin 630 has been closed for the sufficient period of time, the GPIO pin 630 is opened thereby causing the voltage at the output terminal to return to its previous value. An advantage of this virtual button circuit and associated signal processing of the headset 600 is that no mechanical switches are required on the headset 600 and no design changes are required on the device side.

According to further examples, the headset 600 may be configured to generate plural virtual buttons by repeating the above arrangement, in various configurations, for the number of desired virtual buttons. In one example of the headset 600, plural force sensors may each be configured to control a unique GPIO pin from among plural GPIO pins, and each virtual button circuit may comprise a force sensor, an audio chip and a GPIO pin (i.e. as a sensor-chip-pin combination). Each sensor-chip-pin combination may be configured to connect and disconnect a different resistor to ground in order to vary the voltage generated at the output terminal 720 to indicate a virtual button press event. Each variation in voltage may indicate a different virtual button press event at the user device. In this example, each force sensor is configured to generate a single virtual button.

In another example of the headset 600, a single force sensor is configured to control plural GPIO pins by virtue of processing performed by the signal processor 710. That is, the signal processor 710 may be configured to compare the value of the software variable to a plurality of characteristic ranges, each of which correspond to a different GPIO pin. Based on this processing, the control signal may be sent from the signal processor 710 to the GPIO pin corresponding to the characteristic range in which the value is determined to fall. In this example, a single force sensor is configured to generate plural virtual buttons.

In another example of the headset 600, plural force sensors are each configured to control plural GPIO pins. In this example, each force sensor has a corresponding audio chip. For each force sensor, from among plural force sensors, the respective signal processor may be configured to compare the value of the software variable to a plurality of characteristic ranges, each of which correspond to a different GPIO pin. The plurality of characteristic ranges may be a single group of characteristic ranges to which all the software variable values are compared. Alternatively, each force sensor may have a dedicated group of characteristic ranges to which the software variable values are compared. Each characteristic range may have a corresponding GPIO pin which is operated if the converted digital signal falls within that corresponding range. Based on this processing, the control signal may be sent from the respective signal processor to the GPIO pin corresponding to the characteristic range in which the respective value is determined to fall. In this example, plural force sensors are each configured to generate plural virtual buttons. In an alternative example, the plural force sensors may share the same audio chip.

The voltage signal generated by the virtual button circuitry may be sent to the user device via a wired connection using the cable 680 and the 3.5 mm audio jack 660. The 3.5 mm audio jack 660 may comprise three of four poles and each pole may provide a different connection between the headset 600 and the user device, as discussed above in relation to FIG. 1. In FIG. 7, the wireless connection is illustrated by the cable 680 and 3.5 mm audio jack 660 used to connect Device A to the headset 600. FIG. 7 also illustrated that the cable 680 may be connected and disconnected from the headset 600 using any connector type (e.g. a 3.5 mm audio jack, an iOS 30-pin connector, a Lightening connector (i.e. an iOS 8-pin connector), a USB connector, a USB-C connector, a USB-A connector, a mini-USB connector, a micro-USB connector etc.).

In addition to or instead of the wired connection discussed above, the voltage signal generated by the virtual button circuitry may be sent to the user device via a wireless connection using Radio Frequency (RF) technology (e.g. Bluetooth, Z-wave, ZigBee, Infrared Data Association (IrDA), Serial to Peripheral Interface (SPI) and Inter-Integrated Circuit ($I^2C$)).

In some examples of the headset 600, the input signal from plural force sensors can be fused together and processed by an audio chip to create a virtual button signal. A fused input signal may be used to detect complex gestures such as, for example, a user shaking their head.

The skilled person will recognise that some aspects or features of the above-described examples may be embodied as processor control code, for example on a non-volatile carrier medium such as a disk, CD- or DVD-ROM, programmed memory such as read only memory (Firmware), or on a data carrier such as an optical or electrical signal carrier. Some aspects or features may be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the examples may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A functional unit may itself comprise other modules or functional units. A functional unit may be provided by multiple components or sub-units which need not be co-located and could be provided on different integrated circuits and/or running on different processors.

Examples may be implemented in a host device, especially a portable and/or battery powered host device such as a mobile computing device for example a laptop or tablet computer, a games console, a remote control device, a home automation controller or a domestic appliance including a smart home device a domestic temperature or lighting control system, a toy, a machine such as a robot, an audio player, a video player, or a mobile telephone for example a smartphone.

Many electronic devices include acoustic output transducers, i.e. transducers for converting a suitable electrical driving signal into an acoustic output such as a sonic pressure wave or mechanical vibration. For instance many electronic devices may include one or more loudspeakers for sound generation, e.g. for playback of audio content and/or voice communications and/or providing audible notifications. Such loudspeakers may comprise an electromagnetic actuator, for example a voice coil motor which is mechanically coupled to a flexible diaphragm, for example a conventional loudspeaker cone, or which is mechanically coupled to a surface of a device, for example the glass screen of a cell phone. Some electronic devices may also include acoustic output transducers capable of generating ultrasonic waves, e.g. for proximity detection type applications and/or machine-to-machine communication. Many electronic devices may additionally or alternatively include more specialised acoustic output transducers, i.e. haptic transducers, tailored for generating vibrations, e.g. for haptic control feedback or notifications to a user. Additionally or alternatively an electronic device may have a connector, e.g. a socket, for making a removable mating connection with a corresponding connector of an accessory apparatus and may be arranged to provide a driving signal to the connector so as to drive a transducer, of one or more of the types mentioned above, of the accessory apparatus when connected. Such an electronic device will thus comprise driving circuitry for driving the transducer of the host device or connected accessory with a suitable driving signal. For acoustic transducers the driving signal will generally be an analogue time varying voltage signal, i.e. some time varying waveform.

It should be noted that the above-mentioned examples illustrate rather than limit the invention, and that those skilled in the art will be able to design many alternative examples without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. An audio apparatus for communicating with a user device, the audio apparatus comprising:
   a sensor configured to sense a user input and to generate an input signal representing the user input; and
   electronic circuitry operable to receive the input signal, wherein the electronic circuitry is configured to:
   process the input signal, and
   generate a control signal for controlling at least one switch based on the input signal,
   wherein the input signal is processed by configuring the electronic circuitry to:
      identify a characteristic of the input signal,
      compare the characteristic of the input signal to a plurality of characteristic ranges, wherein each of the plurality of characteristic ranges corresponds to a different switch from among plural switches, and
      if the characteristic is determined to be within one of the plurality of characteristic ranges, generate the control signal for controlling the switch corresponding to the determined characteristic range.

2. The audio apparatus according to claim 1, wherein the sensor is a force sensor configured to sense an applied force and the input signal represents the applied force.

3. The audio apparatus according to claim 1, wherein each switch is provided in series with a corresponding resistance, and each switch is configured to operably connect the corresponding resistance between an output terminal of the audio apparatus and a voltage terminal.

4. The audio apparatus according to claim 1, the audio apparatus further comprising:
   plural sensors each configured to sense a user input and to generate an input signal representing the respective user input, each sensor being associated with at least one switch from among plural switches, and
   the electronic circuitry is operable to:
      receive an input signal from among the plural sensors,
      process the input signal, and
      generate the control signal for controlling the at least one switch associated with the sensor.

5. The audio apparatus according to claim 4, wherein the plural sensors are force sensors each configured to sense an applied force and the input signals represent the respective applied force.

6. The audio apparatus according to claim 4, wherein each of the plural switches is provided in series with a corresponding resistance, and each switch is configured to operably connect their respective resistance between the output terminal of the audio apparatus and the voltage terminal.

7. The audio apparatus according to claim 4, wherein:
   the electronic circuitry is configured to combine two or more input signals to generate a combined control signal, and
   the combined control signal controls a single switch.

8. The audio apparatus according to claim 1, wherein the plurality of characteristic ranges have different respective first and second thresholds, and the electronic circuitry is further configured to determine that the characteristic is within one of the plurality of characteristic ranges if the characteristic is greater than the first threshold and less than the second threshold of a single characteristic range.

9. The audio apparatus according to claim 1, wherein the characteristic represents:
   a magnitude of force;
   a change in force;
   a rate of change in force;
   a length of time a force is applied;
   a direction of movement of a force; and/or
   a repetition of applied force.

10. The audio apparatus according to claim 1, further comprising:
    a mode controller configured to provide an adaptable communication connection for connecting the audio apparatus to the user device, the communication connection being a wired connection means and/or a wireless connection means.

11. The audio apparatus according to claim 10, wherein the wired connection means comprises a cable configured to detachably connect to the audio apparatus.

12. The audio apparatus according to claim 11, wherein the cable comprises a 3.5 mm audio jack for connecting the audio apparatus to the user device.

13. A sensor module for communicating with a user device, the sensor module configured to receive an input signal representing a user input applied to a sensor, the sensor module comprising electronic circuitry operable to:
    process the input signal, and generate a control signal for controlling at least one switching function based on the input signal, wherein the input signal is processed by configuring the electronic circuitry to:
- identify a characteristic of the input signal,
- compare the characteristic of the input signal to a plurality of characteristic ranges, wherein each of the plurality of characteristic ranges corresponds to a different switch from among plural switches, and
- if the characteristic is determined to be within one of the plurality of characteristic ranges, generate the control signal for controlling the switch corresponding to the determined characteristic range.

14. The sensor module according to claim 13, wherein the sensor module is a force sensor module, the sensor is a force sensor and the input signal represents a force applied to the force sensor.

15. The sensor module according to claim 13, wherein the control signal is output from an output terminal of the sensor module.

* * * * *